US011135993B2

(12) United States Patent
Rutelin et al.

(10) Patent No.: US 11,135,993 B2
(45) Date of Patent: Oct. 5, 2021

(54) AIRBAG ARRANGEMENT

(71) Applicant: Volvo Car Corporation, Gothenburg (SE)

(72) Inventors: Sebastian Rutelin, Gothenburg (SE); Johan Rosenberg, Lerum (SE)

(73) Assignee: Volvo Car Corporation, Gothenburg (SE)

(*) Notice: Subject to any disclaimer, the term of this patent is extended or adjusted under 35 U.S.C. 154(b) by 49 days.

(21) Appl. No.: 16/568,384

(22) Filed: Sep. 12, 2019

(65) Prior Publication Data
US 2020/0130634 A1 Apr. 30, 2020

(30) Foreign Application Priority Data
Oct. 24, 2018 (EP) ..................................... 18202254

(51) Int. Cl.
*B60R 21/2338* (2011.01)
(52) U.S. Cl.
CPC ................................ *B60R 21/2338* (2013.01)
(58) Field of Classification Search
CPC B60R 2021/23386; B60R 2021/23388; B60R 21/2338
USPC ..................................................... 280/728.1
See application file for complete search history.

(56) References Cited

U.S. PATENT DOCUMENTS

| | | | | |
|---|---|---|---|---|
| 6,315,323 B1* | 11/2001 | Pack, Jr. | ............... | B60R 21/233 280/735 |
| 9,308,883 B1* | 4/2016 | Schneider | ............. | B60R 21/231 |
| 2005/0206138 A1* | 9/2005 | Breuninger | ........... | B60R 21/231 280/729 |
| 2006/0186656 A1* | 8/2006 | Kumagai | .............. | B60R 21/231 280/743.2 |
| 2010/0109306 A1* | 5/2010 | Dong | .................. | B60R 21/2338 280/743.2 |
| 2012/0007348 A1* | 1/2012 | Wehner | ................. | B60R 21/231 280/730.1 |

(Continued)

FOREIGN PATENT DOCUMENTS

DE 102017101060 A1 7/2018
WO 2016164793 A1 10/2016

OTHER PUBLICATIONS

Dec. 13, 2018 European Search Report issue on International Application No. EP18202254.

*Primary Examiner* — John D Walters
*Assistant Examiner* — Hilary L Johns
(74) *Attorney, Agent, or Firm* — Clements Bernard Walker; Christopher L. Bernard

(57) ABSTRACT

An airbag arrangement (3) for a vehicle (1). The airbag arrangement comprises an inflatable airbag (5) and an external extension control member (7) being operatively associated with said airbag. The airbag is adapted to be inflated in a longitudinal direction (x) of the vehicle to a position between an interior portion (13) of the vehicle in front of a seated vehicle occupant (17) and an upper body region (19) of the seated vehicle occupant. The external extension control member has a selectable operative length ($l_o$). The external extension control member controls deployment of the airbag by means of the selectable operative length. The present disclosure also relates to a vehicle comprising the airbag arrangement and a method for deploying an airbag of the airbag arrangement.

15 Claims, 4 Drawing Sheets

(56) References Cited

U.S. PATENT DOCUMENTS

| | | | |
|---|---|---|---|
| 2015/0274116 A1* | 10/2015 | Jaradi | B60R 21/263 |
| | | | 701/45 |
| 2016/0311392 A1* | 10/2016 | Jindal | B60R 21/01512 |
| 2017/0240132 A1* | 8/2017 | Schneider | B60R 21/2338 |
| 2017/0334386 A1* | 11/2017 | Park | B60R 21/2171 |
| 2018/0043852 A1* | 2/2018 | Fischer | B60R 21/233 |
| 2018/0326938 A1* | 11/2018 | Rickenbach | B60R 21/233 |
| 2019/0217803 A1* | 7/2019 | Dry | B60R 21/23138 |
| 2019/0217805 A1* | 7/2019 | Dry | B60N 2/14 |
| 2019/0248322 A1* | 8/2019 | Herzenstiel | B60R 21/207 |
| 2019/0375363 A1* | 12/2019 | Abe | B60R 21/214 |

* cited by examiner

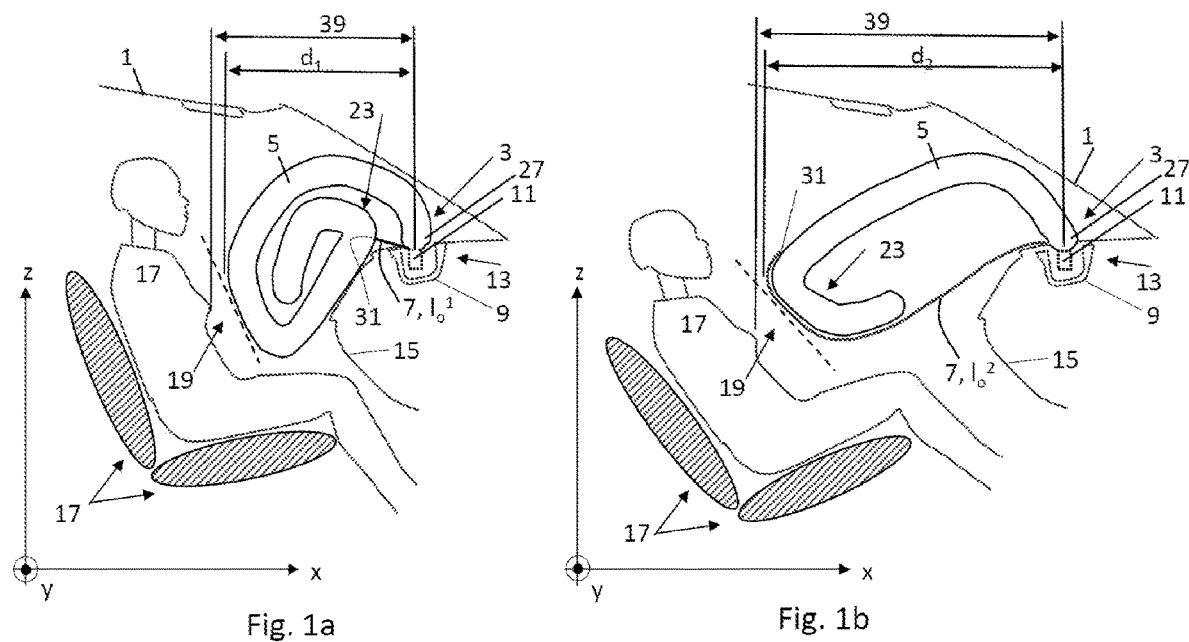

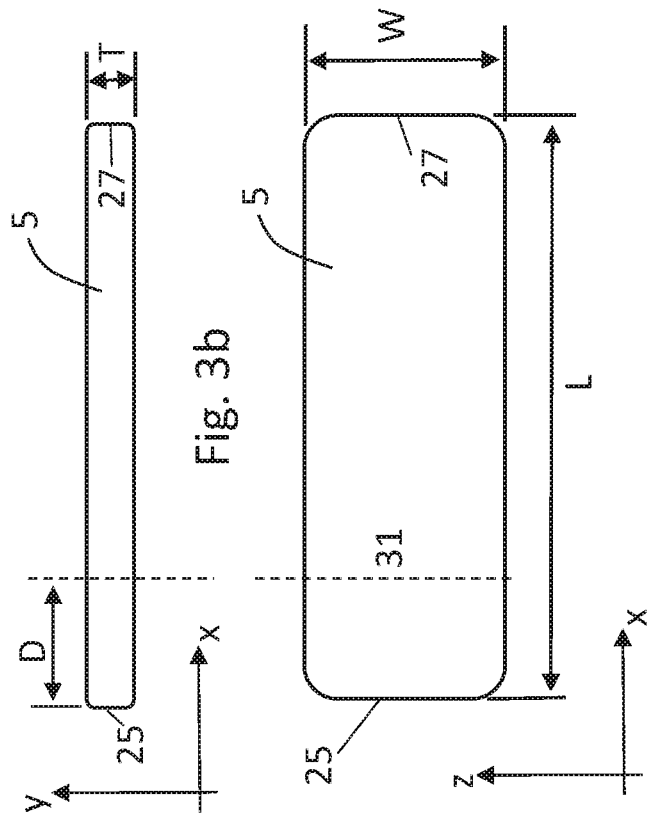
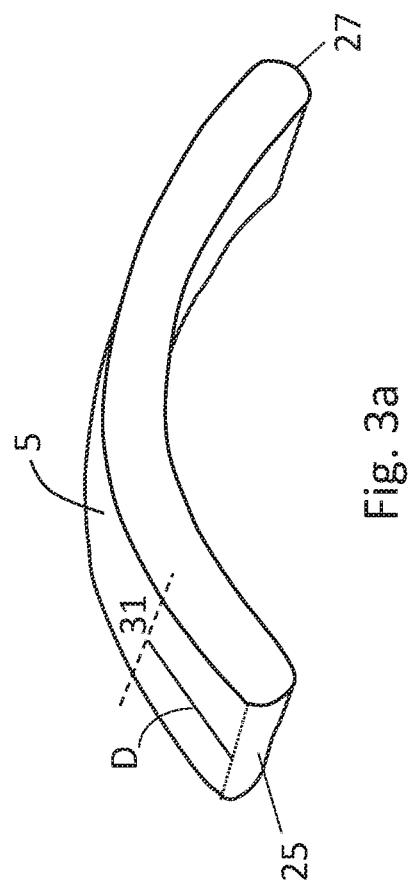

AIRBAG ARRANGEMENT

CROSS-REFERENCE TO RELATED APPLICATION

The present disclosure claims the benefit of priority of co-pending European Patent Application No. 18202254.1, filed on Oct. 24, 2018, and entitled "AIRBAG ARRANGEMENT," the contents of which are incorporated in full by reference herein.

TECHNICAL FIELD

The present disclosure relates to an airbag arrangement for a vehicle. The present disclosure further relates to a vehicle comprising the airbag arrangement. The present invention also relates to a method for deploying an airbag of the airbag arrangement.

BACKGROUND

A vehicle may be equipped with an airbag for protection of an upper body region of a vehicle occupant during a collision. The airbag in its inflated position is intended to restrain the upper body region of the vehicle occupant and thereby protect the vehicle occupant from colliding with an interior structure such as an instrument panel and/or steering wheel in front of the seat. It is known various airbags aiming at providing coverage for different sized vehicle occupants and different crash modes.

With the introduction of vehicles with AD capabilities, i.e. autonomous drive capabilities, there is a potential for the occupants to move and adjust the vehicle seat even more freely than is possible today. In particular, a more retracted, as well as reclined position, than allowed or feasible today may be desirable, or at least more frequently used, and for any seat in a vehicle.

Hence, the development of AD vehicles poses new challenges to inflatable restraint devices, such as a frontal airbag. A vehicle occupant may be seated further away from the instrument panel and potentially also in a more reclined position when the vehicle is in an autonomous driving mode. Thus, the adjustable range of the vehicle seat in the vehicle may be increased further rearwards in the vehicle. In this way, a deployment state of existing/current frontal airbags may be insufficient for achieving the desired early interaction between the upper body region of a vehicle occupant and a frontal airbag in the event of a collision. Furthermore, it is anticipated that the potential of more freely adjusting any vehicle seat to improve riding comfort for an occupant, in particular towards a more reclined, rearward position in the vehicle, will require a frontal airbag arrangement that may correspondingly adapt its deployment state so as to provide the desired early interaction with the vehicle occupant over the complete adjustment range of vehicle seat.

As may be realized from above, there is a desire to improve upper body protection for a vehicle occupant during a collision when the vehicle occupant is situated further rearwards in the vehicle, as may occur for example when a vehicle is in autonomous driving mode, whilst maintaining an appropriate protection for the upper body region of vehicle occupant seated in, for example, a position for manual driving of the vehicle.

SUMMARY

The object of the present invention is to overcome or ameliorate at least one of the disadvantages of the prior art, or to provide a useful alternative.

It is desirable to provide an airbag arrangement being able to perform the task of protecting the upper body region of a seated vehicle occupant when the adjustable range of the seat may be increased further rearwards in the vehicle, for example when positioned in an AD mode, whilst maintaining an appropriate protection for the upper body region of vehicle occupant seated in, for example, a position for manual driving of the vehicle.

It is further desirable to provide an improved airbag arrangement while keeping complexity of the arrangement low.

Thus, the present invention relates to an airbag arrangement for a vehicle. The airbag arrangement comprises an inflatable airbag and an external extension control member being operatively associated with the airbag. The airbag is adapted to be inflated in a longitudinal direction of the vehicle to a position between an interior portion of the vehicle in front of a seated vehicle occupant and an upper body region of the seated vehicle occupant. The external extension control member has a selectable operative length and controls deployment of the airbag by means of the selectable operative length.

An airbag arrangement as recited above implies an airbag arrangement which has a selectable extension in a longitudinal direction of the vehicle when in a deployed state. This, for instance, has the advantageous effect that with the same set-up, i.e. a single airbag housing, inflator and airbag, different deployed states of the airbag arrangement may be achieved, thus rendering a protective effect within a range of seating positions, as will be further explained below.

The external extension control member is situated exteriorly to the inflated airbag. The external extension control member, as will be detailed below, connects to an exterior surface of the airbag, as opposed to an internal member which instead is located inside of, or within, the inflated volume of the airbag.

The airbag arrangement may comprise a length selection means for selecting the operative length of the external extension control member.

Directions as used herein relate to known extensions and directions of a vehicle. As such, the vehicle extends in a longitudinal direction, a transversal direction and a vertical direction, which directions are perpendicular to each other. The longitudinal direction is the normal driving direction of the vehicle. The lateral direction is a width direction of the vehicle.

The longitudinal, transversal and vertical directions are also used herein to describe the airbag. It is then generally assumed that the directions relate to the airbag as mounted in a vehicle. However, the airbag arrangement may also be manufactured and sold as a separate unit. It may then during e.g. transport or storage assume another orientation than when mounted in the vehicle.

As a separate unit, an airbag arrangement as described herein is in fact adapted to deploy along its own longitudinal extension/direction, as will be further detailed below. As such, it is envisaged and easily understood that an airbag arrangement as described herein, may in fact similarly be used to give a protective effect along any other direction related to the vehicle directions. The airbag arrangement may be located such that the longitudinal extension of the airbag coincides with the direction along which a protective effect is desirable. Thus, as an alternative or complement, the airbag arrangement as described herein may be similarly used to provide a protective effect for different crash modes, e.g. during side collisions, and/or for other body regions than the upper body of a vehicle occupant.

The purpose of an airbag arrangement as described herein is to protect the upper body region of a seated vehicle occupant from harmful interaction with an interior portion of the vehicle in front of the vehicle occupant, by providing an initial impact surface for the upper body region of the vehicle occupant during a collision. The initial impact surface is commonly referred to as a providing a restriction plane for the vehicle occupant to be protected.

An interior portion may thus be a portion of an instrument panel, also referred to as a dashboard, and/or a steering wheel in case the vehicle occupant is seated in a front row of a vehicle. As an alternative or complement an interior portion may be a portion of a vehicle seat backrest in case the vehicle occupant to be protected is seated in a rear seat of a vehicle. Hence, an interior portion may be a portion of any vehicle structure in front of any seat in a vehicle capable of accommodating a vehicle occupant for which a protective effect is desirable during a vehicle collision. A vehicle collision in this context implies a frontal or semi-frontal collision.

An airbag arrangement as described herein may well be implemented in any type of vehicle or vessel for private use, commercial use or collective use for example, such as in passenger cars, in taxis, in busses, in trucks, marine applications, aviation applications etc. It may well, as stated above, be implemented for any seat in a vehicle.

The selectable operative length of the external extension control member may control a depth of the airbag arrangement when in a deployed state. A depth of the airbag arrangement is a greatest extent of the airbag arrangement in a longitudinal direction of the vehicle in the upper body region.

A greater depth of the airbag arrangement, as described herein, implies the advantageous effect of an airbag arrangement that may provide an early interaction between the airbag and the upper body region of a vehicle occupant seated further to the rear in the vehicle as seen along the longitudinal direction. Thus, the operative length of the external extension control member may be selected depending on the actual seating position of the vehicle occupant. Thereby, a protective effect may be achieved for seating positions in which the seat has been further adjusted to the rear of the vehicle as seen along a longitudinal direction, i.e. extending further rearwards than an adjustment range of a traditional vehicle seat, for example a front seat of a vehicle primarily intended for manual driving.

The external extension control member may have a minimum selectable operative length and a maximum selectable operative length. A difference between the maximum selectable length and the minimum selectable operative length may be in a range of from 10 to 110 cm, preferably in a range of from 15 to 90 cm, more preferably in a range of from 20 to 70 cm, most preferably in a range of from 30 to 50 cm.

This has the positive effect that a range of different deployment states may be provided. A protective effect by means of said airbag arrangement may thus be provided any seating position of a more freely adjustable vehicle seat.

It is envisaged that any number of selectable operative lengths of the external extension control member may be plausible within a range from the minimum selectable operative length and the maximum operative selectable length.

A difference in depth of the airbag arrangement when in a deployed state based on the minimum and maximum selectable operative length may be at least 15 cm, preferably at least 20 cm, more preferably at least 25 cm, most preferably at least 30 cm. In this way an advantageous early interaction between a vehicle occupant seated further rearwards in the vehicle and the airbag arrangement may be achieved.

As previously mentioned, a positive effect of the airbag arrangement is that the same set-up may be used in different deployed states, i.e. a single inflator that inflates a single airbag. The airbag has the same or substantially the same inflatable volume independently of the deployed state, e.g. the same airbag is inflated independent of the selectable operative length of the external extension control member. The deployment of the airbag is controlled by the external extension control member, and will subsequently adapt to different shapes, or states.

The external extension control member is connected to the airbag to restrict its full extension and thereby control the deployment and thus the location of the airbag when deployed. In this way, a selectable depth of the airbag arrangement may be provided. Thus, an external extension control member as used herein implies that it functions as a means for selecting to which extent the airbag arrangement is deployed in the longitudinal direction. As such, it primarily does not inflict or change the inflated volume, but instead forces the inflated volume to adapt to a certain shape.

The airbag arrangement may comprise a support structure, located at or comprised in the interior portion of the vehicle in front of the seated vehicle occupant. The support structure may anchor a proximal end or portion of the airbag to the vehicle, and the external extension control member connects a distal portion of the airbag to the support structure.

The airbag arrangement in this way implies that the external extension control member is adapted to control deployment of the airbag such that it provides or contributes to a selectable depth of the airbag. By controlling deployment of the airbag, the external extension control member having a selectable operative length, the extent to which the airbag is restricted from reaching its full extension is controlled.

In other words, by selecting the operative length of the external extension control member, the extent to which the airbag is restricted from reaching its full extension is controlled and subsequently the depth of the airbag arrangement is controlled.

Optionally, the airbag may in an unrestricted deployed state have a larger extension in a longitudinal direction when deployed than in a transversal direction and a vertical direction. The longitudinal extension may be in a range of from 50 to 250 cm, preferably in a range of from 80 to 240 cm, more preferably in a range of from 100 to 220 cm. The longitudinal, transversal and vertical directions are as described previously perpendicular to each other and may be related to the airbag arrangement when mounted in the vehicle.

In this context, an unrestricted deployed state of the airbag is without influence of or restriction from the external extension control member. In this way, the airbag has a substantially rectangular shape, i.e. a general mattress-like shape, for which the longitudinal extension is significantly greater than the thickness of the airbag, i.e. the vertical extension. By way of example the thickness of the airbag may be in a range of from 5 to 30 cm, preferably in a range of from 5 to 20 cm, more preferably in a range of from 5 to 15 cm. The longitudinal extension of the airbag may be related to the thickness of the airbag in that a thinner airbag will have to have larger longitudinal extension than a thicker airbag.

The transversal extension of the airbag, i.e. in a vehicle-width direction may be adapted to extend at least along the width of the seated vehicle occupant. By way of example the transversal extension of the airbag may be in a range of from 20 cm to 90 cm, preferably in a range of from 30 to 80 cm.

The external extension control member may comprise an attachment to the airbag at the distal portion. In this case, the attachment is located at a distance from a distal end of the airbag. Preferably, the distance is in a range of from 10% of the longitudinal extension of the airbag in an unrestricted deployed state to 50% of the longitudinal extension of the airbag in an unrestricted deployed state. More preferably, the distance is in a range of from 20% of the longitudinal extension of the airbag in an unrestricted deployed state to 40% of the longitudinal extension of the airbag in an unrestricted deployed state. The distal end is most distal from an inflation point of the airbag. The extension control member may be attached by stitching to the airbag.

By locating the point of attachment of the external extension control member to the airbag at a distance from the distal end of the airbag, a curved shape of the distal portion of the airbag when deployed is achieved. This has the positive effect that a relatively large impact surface for the occupant is obtainable, independent of the airbag depth.

Further, the upper body region of the vehicle occupant may interact with at least a portion of the external extension control member itself, in addition to contact with the surface of the airbag. The external extension control member may constitute a significant part of the initial impact surface and thus being sized to receive at least part of the upper body region of the seated vehicle occupant.

The mattress-like shape of the airbag as described herein implies an effective way of rolling the airbag upon itself, starting at the distal end. The rolled mattress-like shape may be maintained by the external extension control member. Thus, the extent to which the airbag is forced to roll out, or extend, is controlled by the selectable operative length of the external extension control member. In other words, the selectable operative length of the external extension control member controls the depth of the airbag arrangement when in a deployed state by controlling the extent to which the airbag is rolled out, or extended.

An airbag as described herein being rolled upon itself, may result in a wide range of different curved shapes, such as a circle segment, e.g. semi-circle, or an arched shape or folded shape of the airbag depending on the constitution of the airbag itself. For example, if the airbag were to comprise one or more partitions inside, this could act as folding lines. As a result, the shape of the airbag may be irregular, as described above, whilst the airbag is rolled upon itself.

A positive effect of the mattress-like shaped airbag, enabling rolling, is that it enables a variable rearward extension of the restraining plane of the airbag to a larger extent than prior-art solutions, whilst keeping the inflatable volume of the airbag constant when deployed. Controlling the extent to which the airbag is rolled out when in a deployed state provides the variable rearward extension. The same (single) gas generator is used independent of the position of the restraining plane, the airbag has the same inflatable volume independent of the position of the restraining plane provided by the deployed airbag arrangement for the seated vehicle occupant, thus a larger variety of deployed states is achievable without increasing complexity of the airbag module.

An airbag as described herein may have an inflatable volume in a range of from 60 to 140 litres, preferably in a range of from 60 to 100 litres.

As previously mentioned, the external extension control member is attached to an external surface of the airbag such that when the airbag is deployed to a maximum depth the external extension control member restricts full extension of the airbag, in particular it restricts full extension of the distal portion of the airbag. In other words, the airbag is restricted from reaching full extension by the external extension control member forcing at least a distal portion of the airbag to adapt into a curved shape, i.e. a circle segment, e.g. semi-circle, or an arched shape or folded shape. The airbag is to some extent rolled upon itself. The depth of the airbag when deployed, is controlled by the selected operative length of the extension control member.

A depth of the airbag arrangement in a deployed state may thus be in a range of from 20% of the longitudinal extension of the airbag in an unrestricted deployed state to 80% of the longitudinal extension of the airbag in an unrestricted deployed state.

The external extension control member may comprise a selectively releasable extension portion controlling the selectable operative length. The selectively releasable extension portion may form a fold or a loop of the external extension control member, the fold or loop being releasably attached to the rest of the external extension control member, e.g. by tear seam. Upon releasing the selectively releasable extension portion, the operative length of the external extension control member is increased by the selectively releasable extension portion. In this way the selectable operative length can be controlled.

The selectively releasable extension portion may, if not attached to a location on the rest of the external extension control member, by way of example be attached to the airbag housing or some part thereof. Noticeably, the selectively releasable extension portion may be adapted to be attached such that a deployed state of the airbag in which the selectively releasable extension portion is still attached, i.e. not released, is enabled.

The airbag arrangement may comprise length selection means for controlling the selectable operative length of the external extension control member. The length selection means may comprise or consist of tear seam. A tear seam may constitute the releasable attachment of the selectively releasable extension portion.

The tear seam may further be adapted to be opened, i.e. torn, by an activation means. The activation means may comprise or consist of a pyrotechnical release. Thus, the tear seam may be connected to a pyrotechnical release, in a manner known to the skilled person. By way of example, the pyrotechnical release may in turn be wired to a control unit. Upon receiving an electrical signal from the control unit, indicating a selection has been made to open a tear seam, the pyrotechnical release is activated and thus opens the tear seam.

The external extension control member may comprise or consist of a panel, a mesh or one or more straps or belts. The external extension control member may extend along substantially the complete transversal extension of the airbag, in particular advantageous when the external extension control member comprises or consists of a panel or a mesh.

The external extension control member may be of a material such as textile, plastics and or metal wire. The external extension control member may also be of the same material as the airbag itself.

The external extension control member may be attached by stitching and/or gluing to the airbag.

The present invention also relates to a vehicle comprising an interior portion of the vehicle located in front of a seated vehicle occupant and an airbag arrangement as described herein, the airbag being adapted to be inflated to a position between the interior portion of the vehicle and an upper body region of the seated vehicle occupant.

The vehicle may be an autonomous drive vehicle, i.e. an AD vehicle.

The vehicle may comprise at least one sensor for detecting a position of a seated vehicle occupant. The output of the sensor may be used as a basis to select the operative length of the extension control member.

The position of the vehicle occupant may be detected using any kinds of detection means such as camera(s) and/or other types of sensors, such as radar, LIDAR and seat position sensors. It is anticipated that, independent to the detection means, it is the distance between the instrument panel and upper body region of the seated vehicle occupant that is of relevance in selecting deployment mode. Detecting the position of the seated vehicle occupant may directly or indirectly provide the distance described above.

The present invention also relates to a method for deploying an airbag of an airbag arrangement as described herein. The method comprises detecting a position of a seated vehicle occupant, based on the detected position, selecting the operative length of the external extension control member, and based on the selection, deploying the airbag controlled by the external extension control member.

A method as recited above implies the positive effect of an airbag arrangement having a selectable airbag depth. Depending on the seated position of the vehicle occupant an operative length of the external extension control member is selected, which external extension control member controls the depth of the airbag arrangement when deployed.

The method may comprise, in case the airbag arrangement comprises length selection means for controlling the selectable operative length of the external extension control member, controlling the selectable operative length by means of the length selection means.

BRIEF DESCRIPTION OF THE DRAWINGS

The present invention will hereinafter be further explained by means of non-limiting examples with reference to the appended drawings wherein:

FIGS. 1a and b illustrate a first and a second deployment state of an airbag arrangement according to the present invention;

FIGS. 3a, 3b and 3c illustrate an embodiment of an airbag of an airbag arrangement according to the present invention;

Figure 2C:
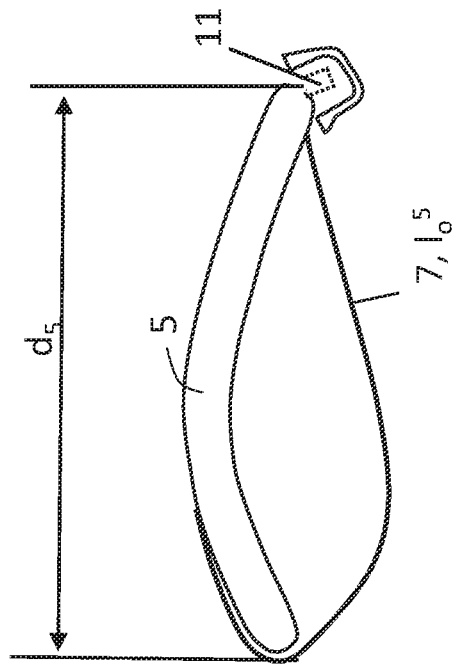
FIGS. 2a, 2b and 2c illustrate another embodiment of deployment states of an airbag arrangement according to the present invention.

It should be noted that the appended drawings are schematic and that individual components are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

The present invention and its advantage over the prior art will be further explained with reference to FIGS. 1 to 5. Directions as used herein relate to known extensions and directions of and in a vehicle 1. As such, the vehicle extends in a longitudinal direction x, a transversal direction y and a vertical direction z, which directions are perpendicular to each other, see FIGS. 1a and 1b. The longitudinal direction x is the normal driving direction of the vehicle 1. The transversal direction y is a width direction of the vehicle 1. The vertical direction z is a height direction of the vehicle.

FIGS. 1a and 1b schematically illustrate a vehicle 1 comprising an airbag arrangement 3 according to an embodiment of the present invention. The airbag arrangement 3 comprises an airbag 5, deployed in two different deployed states, and an external extension control member 7 extended to two different lengths. FIG. 1a shows a first deployed state and FIG. 1b shows a second deployed state. The vehicle 1 is only schematically depicted. The vehicle 1 may be an autonomous drive (AD) vehicle. The airbag arrangement 3 comprises a housing 9 in which the inflatable airbag 5, when undeployed, is stored. In this embodiment an inflator 11 for inflating and deploying the airbag 5 is also stored in the housing 9. However, the inflator 11 may also be stored at a location spaced apart from the housing 9. The housing 9 is depicted at an upper portion 13 of an instrument panel 15 in front of a seated vehicle occupant 17. The inflator 11 is schematically illustrated in the housing 9. As illustrated, the airbag 5 is to be inflated and thereby be deployed to a position between the upper portion 13 of the instrument panel 15 and an upper body region 19 of the seated vehicle occupant 17. The airbag 5 is operatively connected to the inflator 11 for receiving gas therefrom.

The housing 9 is located, see FIGS. 1a and 1b, in a portion 13 of the instrument panel 15 in front of the seated vehicle occupant 17. In this way, protection may be provided not only for passenger side occupants, but it may also provide protection on the driver side of the vehicle 1 when the steering wheel has been replaced by a different solution or entirely removed, as envisaged in an AD vehicle for example, or for a seated occupant in any seat in a vehicle. Hence, the housing 9 may be comprised in any interior portion of the vehicle 1 in front of the seated vehicle occupant 17, such as a backrest of a vehicle seat in case the seated vehicle occupant is seated in a rear seat of a vehicle. Thus, the airbag arrangement 3 as described herein is not limited to protection of occupants seated in a front seat of a vehicle 1 next to an instrument panel 15. The housing 9 may as an alternative or complement also be comprised and fixed in a steering wheel center if the vehicle comprises a steering wheel for manual driving and the airbag arrangement then providing protection for a driver of the vehicle during a frontal vehicle collision.

The longitudinal x, transversal y and vertical z directions of the vehicle 1 are also used herein to describe the airbag 5. It is then assumed that the directions relate to the airbag 5 as mounted in a vehicle 1. However, the airbag arrangement 3 may also be manufactured and sold as a separate unit. It may then during e.g. transport or storage assume another orientation than when mounted in the vehicle 1.

The airbag arrangement 3 depicted in FIGS. 1a and 1b comprises an external extension control member 7 operatively associated with the airbag 5 and adapted to control deployment of the airbag 5. The external extension control member 7 is situated exteriorly to the inflated airbag 5.

Hence, the external extension control member 7 connects to an exterior surface of the airbag 5. The external extension control member 7 connects a distal portion 23 of the airbag 5 to a support structure that anchors a proximal end 27 of the airbag 5, i.e. the housing 9 of the airbag arrangement 3.

The external extension control member 7 has in the deployed state in FIG. 1b a greater operative length $l_o^2$ than the operative length $l_o^1$ in the deployed state in FIG. 1a. Correspondingly, the rearward extension of the airbag 5 along the longitudinal direction x is greater in the deployed state in FIG. 1b than in the deployed state in FIG. 1a. Thus, a selectable operative length $l_o^1$, $l_o^2$ of the external extension control member 7 controls deployment of the airbag 5, and subsequently a depth $d_1$, $d_2$ of the airbag 5. The depth $d_1$, $d_2$ of the airbag 5 in this context is a largest extension of the airbag arrangement 3 in the longitudinal direction x.

The operative length $l_o^1$, $l_o^2$ of the external extension control member 7 is the portion of the external extension control member 7 that extends between the attachments of the external extension control member 7, i.e. the attachment to the distal portion 23 of the airbag 5 and the attachment to the support structure, i.e. the housing 9 of the airbag arrangement 3.

Two different deployed states, see FIGS. 1a and 1b, of the airbag arrangement 3 are depicted, one of which has a greater operative length $l_o^2$ of the external extension control member 7 and subsequently a greater depth $d_2$ than the other. The depth $d_1$, $d_2$ of the airbag in the first and second deployed states, respectively, may correspond to a minimum depth and a maximum depth of the airbag arrangement 3, respectively, and hence may correspond to two preferred deployment states. As illustrated, the upper body region 19 of the seated vehicle occupant 17 is further rearwards in FIG. 1b in relation to the interior portion 15 of the vehicle 1 in front of seated vehicle occupant 17, as compared to in FIG. 1a. Hence, in the deployment state in FIG. 1b, the desired early interaction between the upper body region 19 of the seated vehicle occupant 17 and airbag 5 may be achieved through the greater operative length 12 of the external extension control member 7 and subsequently the depth $d_2$ of the airbag 5.

The external extension control member 7 may have a minimum selectable operative length and a maximum selectable operative length. A difference between the maximum selectable operative length and the minimum selectable operative length may be in a range of from 10 to 110 cm, preferably in a range of from 15 to 90 cm, more preferably in a range of from 20 to 70 cm, most preferably in a range of from 30 to 50 cm.

A difference between the minimum depth of the airbag arrangement 3 and a maximum depth of the airbag arrangement 3 when in a deployed state may be at least 15 cm, preferably at least 20 cm, more preferably at least 25 cm, most preferably at least 30 cm.

Figure 2B:
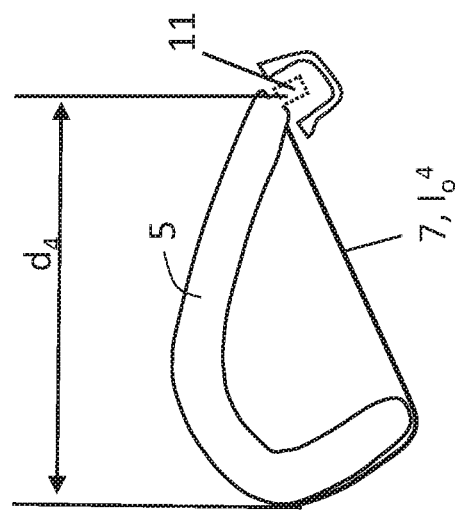
Figure 2A:
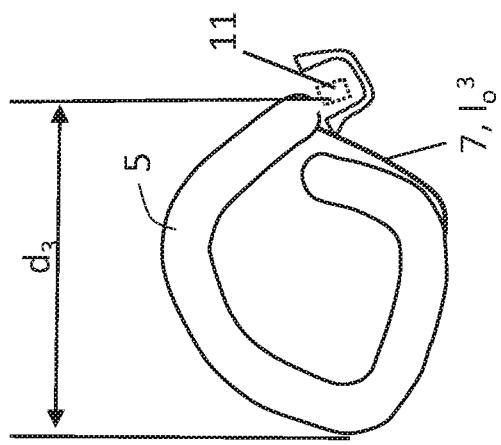

It is envisaged that the operative length $l_o^3$, $l_o^4$, $l_o^5$ of the external extension control member 7 may be selected to form any number of deployed states, for which respective deployed state, the depth $d_3$, $d_4$, $d_5$ of the airbag arrangement 3 falls within a range from the minimum depth to the maximum depth of the airbag arrangement 3, as illustrated in FIGS. 2a to 2c. In FIGS. 2a to 2c, the airbag arrangement 3 comprising the airbag 5 and external extension control member 7 are schematically illustrated in three different deployed states of the airbag arrangement 3, which will be explained in further detail below.

However, first reverting to FIGS. 1a and 1b, as is known to the skilled person, upon detection of a crash condition requiring deployment of the airbag, an actuation circuit is to be directed by a controller to initiate deployment of the airbag. Upon activation of the deployment of the airbag 5, it deploys into a space between the interior portion 13 of the vehicle in front of the seated vehicle occupant 17, i.e. the instrument panel 15 in the embodiment in FIGS. 1a and 1b, and the upper body region 19 of the seated vehicle occupant 17. Hence, the airbag 5 is adapted to be deployed in the longitudinal direction x.

The same set-up is used in the different deployed states, i.e. a single inflator 11 inflates the airbag 5. The airbag 5 has the same or substantially the same inflated volume, i.e. the same deployed airbag volume is inflated independent of the selected operative length lo of the external extension control member 7. The airbag 5 extends to different depths d, based on the selected operative length $l_o$ of the external extension control member 7. This will be further detailed below.

The airbag arrangement 3 as illustrated, having deployment states which extends further rearwards in the vehicle 1 based on the selected operative length of the external extension control member 7, implies an airbag arrangement 3 that enables an early interaction with the upper body region 19 of a seated vehicle occupant 17 under circumstances when the seated vehicle occupant 17 is positioned further rearwards in the vehicle 1, as may be the case when the vehicle seat can be adjusted more freely than, for example a vehicle where the adjustment range for is restricted or adapted for manual driving. It is envisaged that for example in an AD-vehicle, a more freely adjustable adjustment range may be desirable, in particular more adjustable to the rear of the vehicle, allowing a seated vehicle occupant to be in a more reclined or resting position.

With reference to FIGS. 3a to 3c an airbag 3 of the airbag arrangement 5 according to an embodiment is schematically depicted in order to explain some features of the airbag 5. FIG. 3a shows a perspective view of the airbag 5 and FIGS. 3b and 3c illustrates the airbag 5 in different views, from above and from the side respectively. The airbag 5 is illustrated in an unrestricted deployed state. In this context, an unrestricted deployed state is a deployed state of the airbag 5 without influence of or restriction from the external extension control member.

As illustrated, the airbag 5 then has a substantially flat, rectangular shape, typically similar to the shape of a mattress. The airbag 5 has extensions in a longitudinal x, a transversal y and a vertical z direction respectively. The airbag 5 has a larger extension L in the longitudinal direction x than in the transversal direction y and the vertical direction z. The longitudinal extension L may be in a range of from 50 to 250 cm, preferably in a range of from 80 to 240 cm, more preferably in a range of from 100 to 220 cm.

The extension of the airbag 5 in the vertical direction z is referred to as the thickness T of the airbag 5 when deployed. The thickness T of the airbag 5 may be in a range of from 5 to 30 cm, preferably in a range of from 5 to 20 cm, more preferably in a range of from 5 to 15 cm.

The transversal extension of the airbag, i.e. in a vehicle-width direction thus being referred to as the width W of the airbag 5 may be adapted to extend at least along the width of the seated vehicle occupant. The transversal extension W of the airbag may be in a range of from 20 to 90 cm, preferably in a range of from 30 to 80 cm.

The airbag comprises a distal end 25 and a proximal end 27. The proximal end 27 is closest to an inflation point of the airbag 5. Hence, the proximal end 27 is anchored to the support structure. The distal end 25 is most distal from the inflation point when the airbag is in its unrestricted deployed state. Hence, the distal end 25 of the airbag 5 is the last portion of the airbag 5 to be inflated.

Although the outer shape of the airbag 5 is depicted as substantially flat in the unrestricted deployed state, the airbag 5 may be comprised of a plurality of chambers, along the longitudinal direction, being separated by partitions formed inside the airbag, which may give the external surface of the airbag a wavy appearance, however whilst still maintaining a substantially rectangular mattress-like shape.

When deployed, the airbag 5 is restricted by the external extension control member 7 from reaching its full extension, as illustrated in FIGS. 1a and 1b and FIGS. 2a to 2c. The depth d of the airbag arrangement 3 in a deployed state may be in a range of from 20% of the longitudinal extension L of the airbag 5 to 80% of the longitudinal extension L of the airbag 5, based on the selected operative length $l_o$ of the external extension control member.

The mattress-like shape of the airbag 5 as described herein allows for an effective way of rolling the airbag upon itself, starting at the distal end, which rolled mattress-like shape may be maintained by the external extension control member 7. Thus, the airbag 5 is depicted as having a shape like that of a rolled mattress when in a deployed state in FIG. 1a. In FIG. 1b, the seemingly rolled mattress-like shaped airbag has been forced to roll out to a greater extent compared to the deployed state in FIG. 1a, thus, extending to a greater depth. The external extension control member 7 is correspondingly depicted as having a greater length. Thus, the operative length $l_o$ of the external extension control member controls the depth d of the airbag 5 when in a deployed state by controlling the extent to which the airbag is rolled out, or extended.

An airbag 5 as described herein, being rolled upon itself, may result in a wide range of different curved shapes, such as a circle segment, e.g. semi-circle, or an arched shape or folded shape of the airbag depending on the constitution of the airbag itself. For example, if the airbag were to comprise partitions inside, as previously described, the partitions could act as folding lines. As a result, the shape of the airbag may be irregular whilst the airbag is rolled upon itself. i.e. not as smoothly curved as is illustrated in the embodiments in FIGS. 1a and 1b and FIGS. 2a to 2c.

The airbag arrangement as described herein comprises length selection means for selecting the operative length $l_o$ of the external extension control member 7. This will be further detailed below.

The longitudinal extension L of the airbag 5 in its unrestricted deployed state may define a maximum reachable rearward extension of the deployed airbag. However, as described, the external extension control member 7 comprises an attachment 31 to the distal portion 23 of the airbag 5, which attachment 31 is located at a distance D from the distal end 25 of the airbag 5, see FIGS. 3a and 3b, in which the dashed line indicates the plane of the attachment 31. The distance D from the distal end 25 to attachment 31 of the external extension control member 7 may be in a range of from 10% of the longitudinal extension L of the airbag 5 in an unrestricted deployed state to 50% of the longitudinal extension L of the airbag 5 in an unrestricted deployed state, preferably the distance D may be in a range of from 20% of the longitudinal extension L of the airbag 5 in an unrestricted deployed state to 40% of the longitudinal extension L of the airbag 5 in an unrestricted deployed state.

In this way, by locating the point of attachment 31 of the external extension control member 7 to the airbag 5 at a distance D from the distal end 25 of the airbag 5, a curved shape of the distal portion 23 of the airbag 5 when deployed is achieved. Thereby a relatively large impact surface for the occupant is maintained, independent of the airbag depth.

Hence, as previously mentioned, the external extension control member 7 is attached to an external surface of the airbag 5 such that when the airbag is deployed to a maximum depth the external extension control member 7 restricts full extension of the airbag 5, in particular it restricts full extension of the distal portion 23 of the airbag 5. In other words, the airbag 5 is restricted from reaching full extension by the external extension control member 7. To which depth d the airbag 5 is deployed, is controlled by the selected operative length $l_o$ of the external extension control member 7.

As described herein, the external extension control member 7 has a selectable operative length $l_o$, which controls the longitudinal extension of the airbag 5 in a deployed state. The external extension control member 7 may comprise a selectively releasable extension portion. By releasing the selectively releasable extension portion, the operative length $l_o$ of the external extension control member 7 is increased. The selectively releasable extension portion may form a fold or a loop of the external extension control member 7. The fold may be releasably attached, e.g. to the rest of the external extension control member 7. Upon releasing the selectively releasable extension portion, the operative length $l_o$ of the external extension control member 7 is increased by the selectively releasable extension portion. Thus the fold forms a selectively releasable extension portion of the external extension control member 7 that upon release will increase the length of the external extension control member 7.

It is envisaged that the external extension control member 7 may comprise a plurality of selectively releasable extension portions, e.g. formed as folds of the external extension control member 7, as described above. Each selectively releasable extension portion may be individually releasably attached, e.g. by a tear seam. In this way, the selectable operative length $l_o$ of the external extension control member 7 may be provided.

The external extension control member 7 may comprise or consist of a panel, a mesh or one or more straps or belts. The external extension control member 7 may extend along the complete or substantially complete transversal extension, i.e. the width W, of the airbag 5. This is in particular advantageous when the external extension control member 7 comprises or consists of a panel or a mesh.

The external extension control member 7 may be of a material such as textile, plastics and or metal wire. The external extension control member 7 may also be of the same material as the airbag itself.

The airbag arrangement as described herein comprises length selection means for selecting an operative length $l_o$ of the extension control member 7, as illustrated in FIGS. 1a and 1b and FIGS. 2a to 2c.

The length selection means may comprise or consist of tear seam. This is advantageous since it enables an easy and simple way of carrying out a selection of operative length lo. Tear seams may constitute the releasable attachment of the selectively releasable extension portion. The tear seams may further be adapted to be opened, i.e. torn, by a pyrotechnical release. Thus, the tear seam may be connected to a pyrotechnical release, in a manner known to the skilled person. Activating the pyrotechnical release will open the tear seam which will no longer act as an attachment. By way of example, the pyrotechnical release may in turn be wired to a control unit. Upon receiving an electrical signal from the control unit, indicating a selection has been made to open a tear seam, the pyrotechnical release is activated and thus opens the tear seam.

Figure 4:
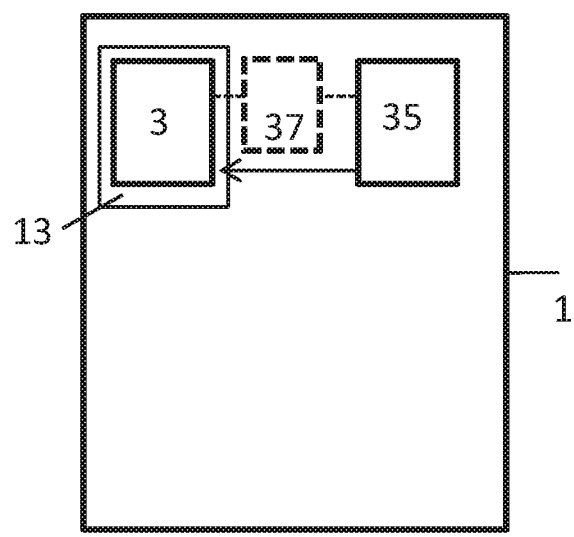
FIG. 4 illustrates a vehicle comprising an airbag arrangement according the present invention.

With reference to FIG. 4, a vehicle 1 comprising an interior portion 13 of the vehicle in front of a seated vehicle occupant and an airbag arrangement 3 is schematically illustrated. The vehicle 1 further comprises at least one sensor 35 for detecting a position of a seated vehicle occupant. The output of the sensor 35 is used as a basis to select the operative length $l_o$ of the external extension control member 7 as illustrated by the arrow in FIG. 4. This may involve the release of a selectively releasable extension portion, depending on the embodiment of the airbag arrangement 3. By way of example, a controller 37 is adapted to receive information from the sensor 35, and further is adapted to send a signal to the airbag arrangement 3 to actuate deployment of the airbag.

As previously described the position of the vehicle occupant in relation to the interior portion may refer to if the vehicle occupant is seated in within a normal driving adjustment range, or, if the vehicle occupant is seated further to the rear than the normal driving adjustment range, for example as envisaged during AD. A normal driving adjustment range may in this context correspond to an adjustment range for a seat adapted for manual driving. It is anticipated that a more freely adjustable adjustment range is desirable, in particular more adjustable to the rear in order for a seated vehicle occupant to be in a reclined resting position. By way of example, when a vehicle is in AD-mode, or for example in a taxi or other passenger transportation vehicle with increased demands for comfortable resting positions for the seated occupant at least during some part of a journey.

The position of the vehicle occupant may be detected using any kinds of detection means such as camera(s) and/or other types of sensors, such as radar, LIDAR, and seat location sensors. It is anticipated that, independent of means chosen for detection, it is anticipated that it is the distance 39 between the interior portion at a location in front of the seated vehicle occupant and the upper body region of the seated vehicle occupant that is of relevance in selecting the operative length $l_o$ of the extension control member 7, see FIGS. 1a and 1b. Noticeably, detecting the position of the seated vehicle occupant will directly or indirectly provide the distance 39 described above.

Figure 5:
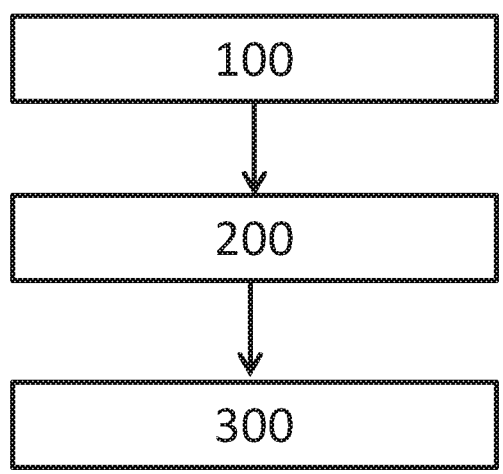
FIG. 5 illustrates a method according to the present invention.

With reference to FIG. 5 a method of deploying an airbag 5 of an airbag arrangement 5 according to the present invention will be described. The method comprises:
100: detecting a position of a seated vehicle occupant 17,
200: based on the detected position, selecting the operative length $l_o$ of the extension control member 7,
300: based on the selected operative length lo, deploying the airbag 5 controlled by the external extension control member 7.

With reference to FIG. 5, step 200 of the method may comprise selecting the operative length $l_o$ by means of the length selection means.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An airbag arrangement for a vehicle, said airbag arrangement comprising an inflatable airbag and an external extension control member being operatively associated with said airbag, said airbag being adapted to in a deployed state be inflated in a longitudinal direction (x) of said vehicle to a position between an interior portion of said vehicle in front of a seated vehicle occupant and an upper body region of said seated vehicle occupant, wherein said external extension control member has a selectable operative length ($l_o^1$, $l_o^2$, $l_o^3$, $l_o^4$, $l_o^5$), and wherein said external extension control member controls deployment of said airbag by means of said selectable operative length ($l_o^1$, $l_o^2$, $l_o^3$, $l_o^4$, $l_o^5$), wherein said airbag in an unrestricted deployed state has a substantially rectangular shape, for which a longitudinal extension (L) of said airbag is significantly greater than a vertical extension (T) of said airbag, said shape allowing rolling of said airbag upon itself starting at a distal end, the extent to which said airbag is forced to roll out in said deployed state being controlled by said selectable operative length ($l_o^1$, $l_o^2$, $l_o^3$, $l_o^4$, $l_o^5$) of said external extension control member.

2. The airbag arrangement of claim 1, wherein said selectable operative length ($l_o^1$, $l_o^2$, $l_o^3$, $l_o^4$, $l_o^5$) of said external extension control member controls a depth ($d_1$, $d_2$, $d_3$, $d_4$, $d_5$, $d_6$) of said airbag arrangement when in a deployed state, said depth ($d_1$, $d_2$, $d_3$, $d_4$, $d_5$, $d_6$) being a largest extension of said airbag arrangement in said longitudinal direction (x) of said vehicle.

3. The airbag arrangement of claim 1, wherein said external extension control member has a minimum selectable operative length and a maximum selectable operative length, and wherein a difference between said maximum selectable length and said minimum selectable operative length is in a range of from 10 to 110 cm.

4. The airbag arrangement of claim 1, wherein a support structure, located at or comprised in said interior portion, anchors a proximal end or proximal portion of said airbag to said vehicle, and said external extension control member connects a distal portion of said airbag to said support structure.

5. The airbag arrangement of claim 4, wherein said external extension control member comprises an attachment to said airbag at said distal portion, said attachment being located at a distance (D) from said distal end of said airbag, preferably in a range of from 10% of said longitudinal extension (L) of said airbag to 50% of said longitudinal extension (L) of said airbag, said distal end being most distal from an inflation point of said airbag.

6. The airbag arrangement of claim 1, wherein said airbag in said unrestricted deployed state has a larger extension (L) in a longitudinal direction (x) than in a transversal direction (y) and a vertical direction (z), said extension (L) in said longitudinal direction (x) being in a range of from 50 to 250 cm, said longitudinal (x), transversal (y) and vertical (z) directions being perpendicular to each other.

7. The airbag arrangement of claim 5, wherein said depth ($d_1$, $d_2$, $d_3$, $d_4$, $d_5$, $d_6$) of said airbag arrangement in a deployed state is in a range of from 20% of said longitudinal extension (L) of said airbag to 80% of said longitudinal extension (L) of said airbag.

8. The airbag arrangement of claim 1, wherein said external extension control member comprises a selectively releasable extension portion controlling said selectable operative length ($l_o^1$, $l_o^2$, $l_o^3$, $l_o^4$, $l_o^5$).

9. The airbag arrangement of claim 8, wherein said selectively releasable extension portion forms a fold or a loop of said external extension control member, said fold or loop being releasably attached to the rest of said external extension control member and wherein upon releasing said selectively releasable extension portion, said operative length of said external extension control member is increased by said selectively releasable extension portion.

10. The airbag arrangement of claim 1, wherein said airbag arrangement comprises length selection means for controlling said selectable operative length ($l_o^1$, $lo_2$, $l_o^3$, $l_o^4$, $l_o^5$) of said external extension control member.

11. The airbag arrangement of claim 1, wherein said external extension control member comprises or consists of a panel, a mesh or one or more straps or belts.

12. A vehicle comprising an interior portion of said vehicle at a location in front of a seated vehicle occupant and an airbag arrangement of claim 1, said airbag being adapted to be inflated to a position between said interior portion of said vehicle and an upper body region of said seated vehicle occupant.

13. The vehicle of claim 12, said vehicle further comprising at least one sensor for detecting a position of a seated vehicle occupant, the output of said sensor being used as a basis to select said operative length of said external extension control member.

14. A method for deploying an airbag of an airbag arrangement according to claim 1, said method comprising:
  (a) detecting a position of a seated vehicle occupant,
  (b) based on said detected position, selecting said operative length of said external extension control member, and
  (c) based on said selection, deploying said airbag under control by said external extension control member, wherein the extent to which said airbag is forced to roll out in said deployed state is controlled by said selectable operative length ($l_o^1$, $l_o^2$, $l_o^3$, $l_o^4$, $l_o^5$) of said external extension control member.

15. The method of claim 14, wherein said airbag arrangement comprises length selection means for controlling said selectable operative length of said external extension control member and wherein step (b) comprises controlling said selectable operative length by means of said length selection means.

* * * * *